No. 882,650.
PATENTED MAR. 24, 1908.
A. W. PERRY.
THILL SUPPORT.
APPLICATION FILED SEPT. 3, 1907.
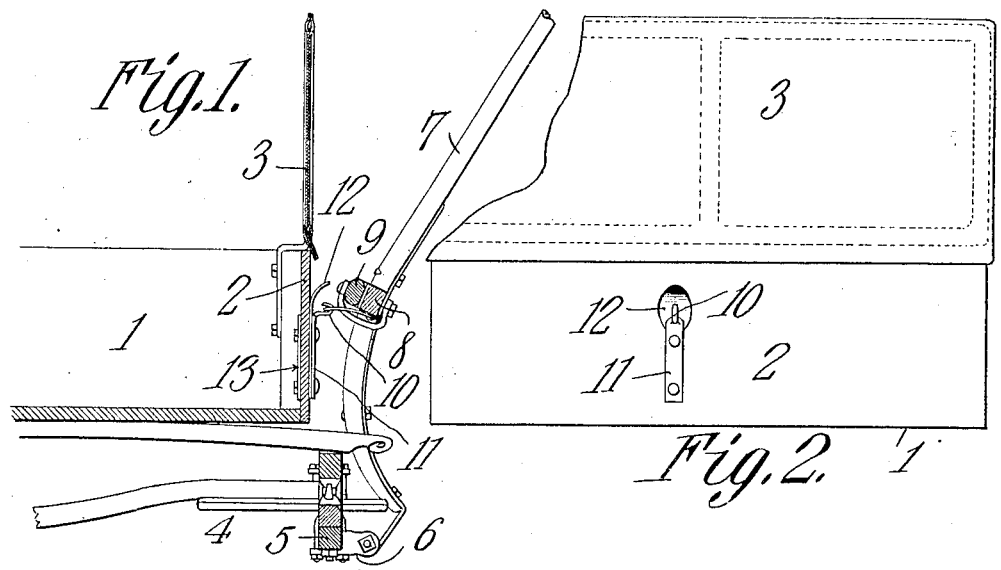
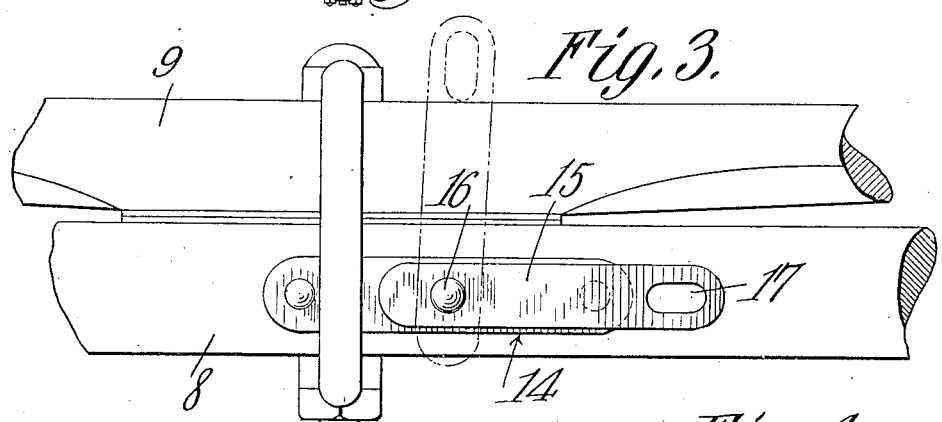
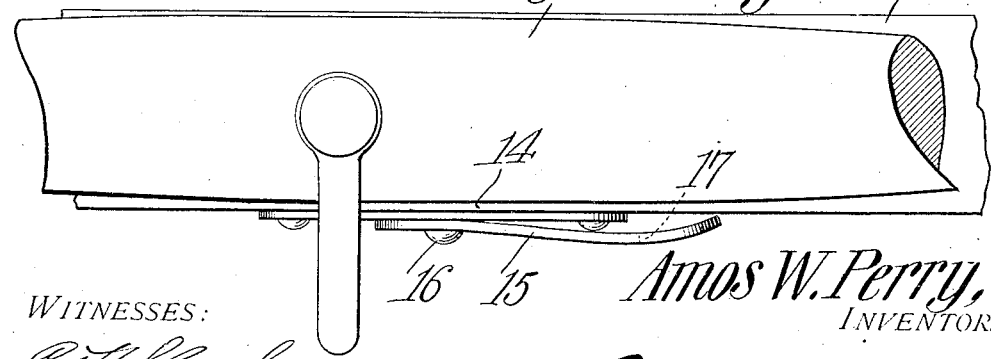
WITNESSES:
Amos W. Perry,
INVENTOR.
By C. A. Snow & Co.
ATTORNEYS
THE NORRIS PETERS CO., WASHINGTON, D. C.

UNITED STATES PATENT OFFICE.

AMOS W. PERRY, OF WAKEFIELD, RHODE ISLAND, ASSIGNOR OF ONE-HALF TO JAMES C. DAVIS, OF PEACE DALE, RHODE ISLAND.

THILL-SUPPORT.

No. 882,650.    Specification of Letters Patent.    Patented March 24, 1908.

Application filed September 3, 1907. Serial No. 391,171.

*To all whom it may concern:*

Be it known that I, AMOS W. PERRY, a citizen of the United States, residing at Wakefield, in the county of Washington and State of Rhode Island, have invented a new and useful Thill-Support, of which the following is a specification.

This invention relates to a device for supporting the thills or shafts of a vehicle in elevated position above the ground when not in use, the object being to provide a novel hanger or fastener for the thills, one part of which is attached to the front of a vehicle body and the other part to the cross bar connecting the thills on which the whiffletree is pivoted.

The thill support of the present invention is simple, cheap, easily applied to a vehicle and from its position at the approximate center of the thill cross bar, each thill receives the same support and there is no straining or twisting of the thills such as is common when but one thill is supported.

In the accompanying drawing, Figure 1 is a longitudinal sectional view through the front end of a vehicle with the improved thill support attached. Fig. 2 is a view in elevation of the front of a vehicle body showing the fixed part of the support attached thereto. Fig. 3 is an enlarged view showing in rear elevation the cross bar between the thills to which the whiffletree is attached, illustrating movable part of the thill support. Fig. 4 is a plan view of the parts illustrated in the preceding figure and on the same scale.

Similar reference numerals are used to point out the same parts on all the figures.

The body of the vehicle is indicated by the numeral 1, the front end by 2 while above it is the dash 3. The running gear denoted by 4 has attached to its front axle 5 a pair of thill couplings 6 in which are pivoted the thills 7 connected by their cross bar 8 carrying the pivoted whiffletree 9. All the above mentioned parts are common to horse drawn vehicles and need no further description.

Fastened to the front 2 of the vehicle body is a horizontally disposed hook 10 projecting forwardly at a right angle from a vertical plate 11 bolted in the approximate center of the front of the body 1. Between the hook plate 11 and the body front 2 is secured a guide plate 12, the lower portion of which is similar in size and shape to the plate 11 but is expanded laterally at its upper end and shaped to curve over the hook 10, as clearly represented in Fig. 1. The hook plate 11 and the guide plate 12 are fastened to the vehicle 1 by means of bolts passing through the two plates, the body front and a rear plate 13 on the inside of the vehicle against which the securing nuts bear.

Bolted at each end to the rear side of the thill cross bar 8 is a flat plate 14 in the center of which a slightly curved link 15 is pivotally secured by a rivet or bolt 16, the free end of said link having therein a longitudinal slot 17. The plate 14 is attached to the cross bar 8 in such position that the link 15 will, when it is swinging upwardly and the thills raised, engage the hook 10 on the vehicle body.

When the link 15 is not in use, it is turned parallel with the plate 14 and being made of spring metal, it will retain its folded position because it is under spring tension.

When the thills are to be held up, the spring link 15 is turned to the position indicated in Fig. 1, and in dotted lines in Fig. 3. The thills are then raised until the end of the link 15, striking the shield 12, is forced downwardly until the slot 17 therein passes over the hook 10. If now, the link be held down for a moment and the thills lowered slightly the link will be retracted and hook 10 engage the slot 17, holding the thills elevated. To lower the thills it is only necessary to raise them sufficiently to disengage the link from the hook. The link then springs up against the guide away from the hook and frees the thills which may then be lowered.

Having thus described the invention, what is claimed is:—

1. The combination with a vehicle and thills connected thereto and having a cross bar; of a forwardly extending supporting hook connected to the vehicle, a guide plate secured back of the hook and overhanging the same, the overhanging portion of said plate being enlarged laterally and curved forwardly in the direction of its length, and a resilient longitudinally slotted supporting link pivotally connected to the cross bar and disposed to engage the hook to support the thills, said link being shiftable into position upon the rear face of the cross bar.

2. The combination with a vehicle, and thills connected thereto and having a cross bar; of lapping plates secured upon the front of the vehicle, a supporting hook integral with and extending forward from one of the plates, a forwardly and upwardly curved guide extending from the other plate and overhanging the hook, a plate secured upon the rear face of the cross bar and extending longitudinally thereof, a longitudinally slotted link pivotally mounted upon said plate and normally parallel therewith and disposed entirely in rear of the bar, said link being shiftable into position above the bar to engage the hook.

In testimony that I claim the foregoing as my own, I have hereto affixed my signature in the presence of two witnesses.

AMOS W. PERRY.

Witnesses:
 JAMES T. NOLAN,
 WILLIAM H. LILLY.